US007079866B2

(12) United States Patent
Takano

(10) Patent No.: US 7,079,866 B2
(45) Date of Patent: Jul. 18, 2006

(54) ADAPTIVE ARRAY ANTENNA AND A METHOD OF CALIBRATING THE SAME

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 601 days.

(21) Appl. No.: 10/284,243

(22) Filed: Oct. 31, 2002

(65) Prior Publication Data

US 2003/0092469 A1 May 15, 2003

(30) Foreign Application Priority Data

Nov. 1, 2001 (JP) ............................ 2001-336998

(51) Int. Cl.
*H04B 1/38* (2006.01)

(52) U.S. Cl. ................ 455/561; 455/562.1; 455/277.1; 455/101

(58) Field of Classification Search ............ 455/278.1, 455/562.1, 561, 101, 277.1; 370/210
See application file for complete search history.

(56) References Cited

U.S. PATENT DOCUMENTS 5,493,307 A * 2/1996 Tsujimoto ................... 455/101
6,154,661 A * 11/2000 Goldburg ................. 455/562.1
6,411,612 B1 * 6/2002 Halford et al. .......... 455/278.1
6,594,509 B1 7/2003 Takakusaki et al.
2002/0169005 A1 * 11/2002 Hiramatsu et al. .......... 455/561
2003/0022649 A1 * 1/2003 Voyer ...................... 455/277.1
2004/0192394 A1 * 9/2004 Nakaya et al. ........... 455/562.1
2004/0204113 A1 * 10/2004 Kisigami et al. ........ 455/562.1
2004/0246889 A1 * 12/2004 Ogawa et al. ............. 370/210

OTHER PUBLICATIONS

Patent Abstracts of Japan, JP 2001-177458, Jun. 29, 2001.

* cited by examiner

*Primary Examiner*—Lana Le
(74) *Attorney, Agent, or Firm*—Oblon, Spivak, McClelland, Maier & Neustadt, P.C.

(57) ABSTRACT

An adaptive array antenna includes an array antenna having a plurality of antenna elements, and a plurality of reception units for receiving reception signals from the respective antenna elements, multiplying the reception signals by respective reception weighting coefficients, and outputting the weighted reception signals. The adaptive array antenna also includes a plurality of transmission units for multiplying transmission signals by respective transmission weighting coefficients and then transmitting the weighted transmission signals from the respective antenna elements, and a reference signal transmission unit for transmitting a predetermined reference signal. Further, the adaptive array antenna includes a signal component separation unit for separating each of the reception signals into a correlated signal component correlated with the reference signal and an uncorrelated signal component uncorrelated with the reference signal, and a weighting coefficient correction unit for updating each of the transmission weighting coefficients on the basis of the corresponding correlated signal component.

4 Claims, 2 Drawing Sheets

ADAPTIVE ARRAY ANTENNA AND A METHOD OF CALIBRATING THE SAME

BACKGROUND OF THE INVENTION

1. Field of the Invention

The present invention relates to adaptive array antennas and to a method of calibrating the same. The present invention is applicable and suitable for adaptive array antennas that control the directivity thereof when transmitting and receiving.

2. Description of the Related Art

In recent years, adaptive array antennas that can change the directivity thereof have been widely used. Adaptive array antennas have a plurality of antenna elements disposed in an array pattern. Each signal received by the corresponding antenna element is weighted by being multiplied by a corresponding weighting coefficient and all signals are then combined, thus capable of controlling the reception directivity pattern for all of the antenna elements. Also, transmission signals are each multiplied by the corresponding weighting coefficient used in receiving and are then transmitted from the respective antenna elements, so that the transmission signals are transmitted in a transmission directivity pattern that is the same as the reception directivity pattern. Consequently, in adaptive array antennas, desired waves can be spatially separated from interference waves, thus realizing SDMA (Space Division Multiple Access), or spatial multiple user access.

Adaptive array antennas need a plurality of antenna elements and the same number of transmission RF units and reception RF units as adaptive array elements. This causes the size of the overall apparatus to be larger. Therefore, adaptive array antennas are generally provided only in base stations.

In practice, fluctuations in characteristics and line length of the elements composing the transmission RF units and the reception RF units in adaptive array antennas cause a difference between the reception directivity pattern and the transmission directivity pattern, even if the weighting coefficients calculated for reception are used for transmitting.

In order to compensate for such fluctuations, correction value calculation processing, which is called calibration, is performed beforehand in adaptive array antennas. Accordingly, correction of the weighting coefficients by using the obtained correction values enables the reception directivity pattern to be made identical to the transmission directivity pattern.

One such method of calibrating adaptive array antennas is the so-called loopback method between antennas. In this method, one of a plurality of antenna elements composing an array antenna is set as a reference antenna. Calibration signals are sent from the reference antenna element, and are received by each of the other antenna elements. Then, the calibration signals are sent from each of the other antenna elements and are received by the reference antenna element. This is called loopback. Then, correction values (calibration factors) are calculated from transfer functions obtained at this time.

Ti: transfer function for i-th transmission RF unit

Rj: transfer function for j-th reception RF unit

Gij: transfer function for space between i-th antenna and j-th antenna

Under the conditions above, a transfer function "Sij" for the overall loopback can be expressed as in the following equation.

$$Sij=TiGijRj \quad (1)$$

These "Ti" and "Rj" include transfer functions for antenna duplexers and the antennas themselves. A calibration factor "Hi" can be expressed as follows:

$$Hi=Rj/Ti \quad (2)$$

"Qij", which is a function that expresses the ratio of "Sij" to "Sji", is adopted here.

$$\begin{aligned} Qij &= Sij/Sji \quad (3) \\ &= TiGijRj/TjGjiRi \end{aligned}$$

Furthermore, given that "Gij=Gji", the following equation can be obtained.

$$\begin{aligned} Qij &= TiGijRj/TiGjiRi \quad (4) \\ &= TiRj/TjRi \\ &= (Rj/Tj)(Ri/Ti) \end{aligned}$$

Assuming that the calibration factor "H1" for the first antenna, which is the reference antenna, is "1", relative calibration factors for each antenna can be expressed as follows:

$$\begin{aligned} H2 &= Q12H1 = Q12 = S12/S21 \quad (5) \\ H3 &= Q13H1 = Q31 = S13/S31 \\ H4 &= Q14H1 = Q41 = S14/S41 \end{aligned}$$

The weighting coefficients for transmitting are corrected using the calibration factors. Given that "Wri" represents the weighting coefficients for receiving, "Wti", which represents the weighting coefficients for transmitting, can be expressed as in the following equation.

$$Wti=Wri*Hi \quad (6)$$

Applying the transmission weights using the corrected weighting coefficients "Wti" enables the reception directivity pattern and the transmission directivity pattern of the adaptive array antenna to be made identical to each other.

When performing calibration in the base station by the loopback method between antennas described above, it is impossible to communicate with a mobile station Furthermore, if radio waves from a mobile station are received during calibration, errors may occur in the calibration. This causes the need for suspension of the operation of the communication system during calibration, thus causing a problem in that the overall communication system cannot be used.

SUMMARY OF THE INVENTION

Accordingly, in view of the above-described points, it is an object of the present invention to provide an adaptive array antenna that performs calibration without suspension of the operation of the adaptive array antenna and a method of calibrating the same.

In order to solve the foregoing problems, the present invention provides an adaptive array antenna. The adaptive array antenna includes an array antenna having a plurality of antenna elements, and a plurality of reception units for receiving reception signals from the respective antenna elements, multiplying the reception signals by respective reception weighting coefficients, and outputting the weighted reception signals. The adaptive array antenna also includes a plurality of transmission units for multiplying transmission signals by respective transmission weighting coefficients and then transmitting the weighted transmission signals from the respective antenna elements, and a reference signal transmission unit for transmitting a predetermined reference signal. Further, the adaptive array antenna includes a signal component separation unit for separating each of the reception signals into a correlated signal component correlated with the reference signal and an uncorrelated signal component uncorrelated with the reference signal, and a weighting coefficient correction unit for updating each of the transmission weighting coefficients on the basis of the corresponding correlated signal component.

Also, the reception units may multiply the uncorrelated signal component by the corresponding reception weighting coefficient.

In the present invention, calibration is performed without suspension of the operation of an adaptive array antenna by transmitting a reference signal from a reference signal transmission unit, separating a reception signal received from each antenna element into a correlated signal component correlated with the reference signal and an uncorrelated signal component uncorrelated with the reference signal, updating each of transmission weighting coefficients on the basis of the corresponding correlated signal component, and multiplying the uncorrelated signal component by a corresponding reception weighting coefficient.

DESCRIPTION OF THE PREFERRED EMBODIMENTS

An embodiment of the present invention will now be described in detail with reference to the drawings.

(1) Overall configuration of adaptive array antenna

Figure 1:
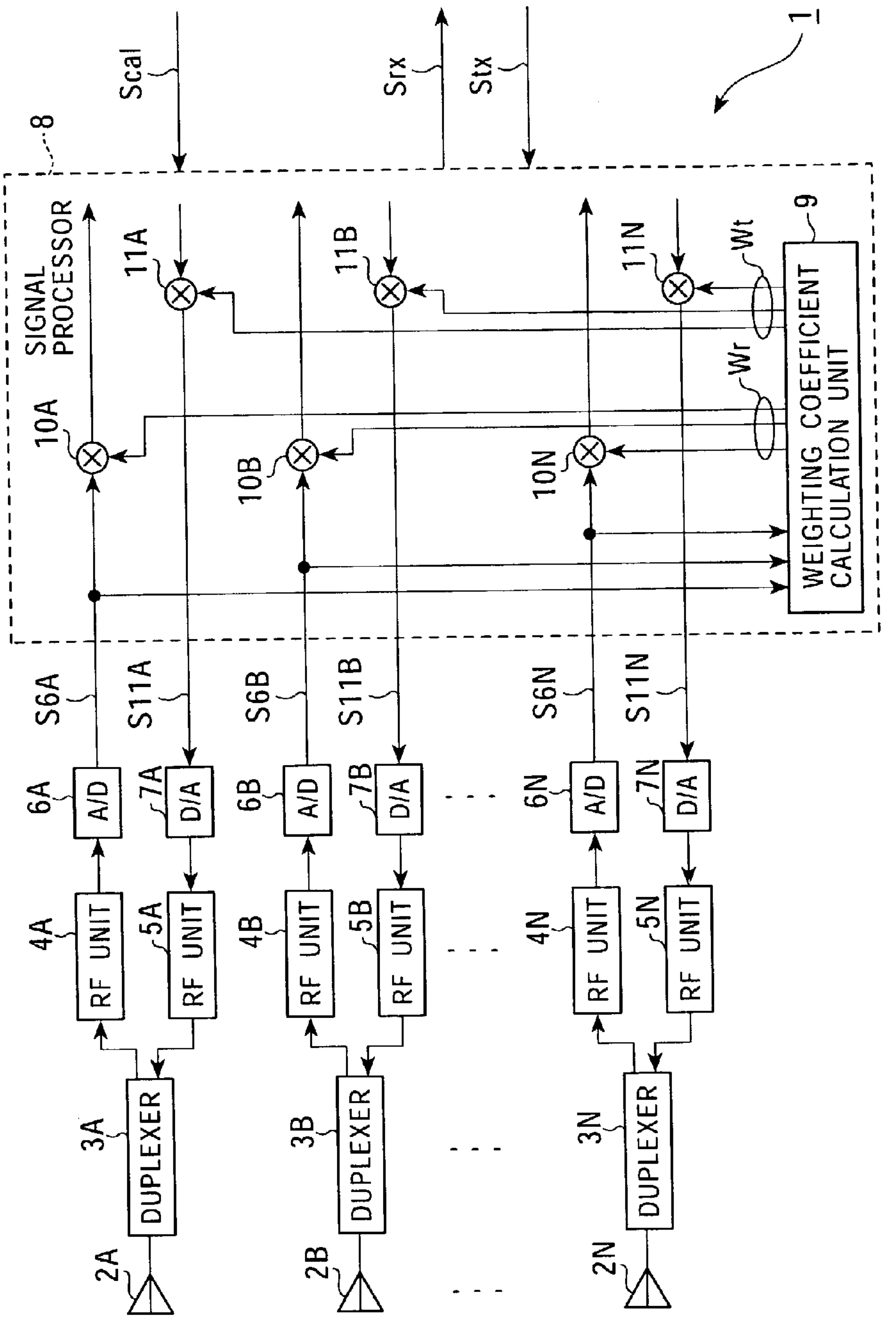
FIG. 1 is a block diagram of the configuration of an adaptive array antenna according to the present invention.

Referring to FIG. 1, an adaptive array antenna 1 according to the present invention includes "N" antenna elements 2A to 2N. The antenna elements 2A to 2N constitute the array antenna 1. The antenna elements 2A to 2N, respectively, are connected to antenna duplexers 3A to 3N. The antenna duplexers 3A to 3N, respectively, are connected to reception RF units 4A to 4N and transmission RF units 5A to 5N.

The reception RF units 4A to 4N receive communication signals transmitted from a mobile station (not shown) via the antenna elements 2A to 2N, respectively. Then, the reception RF units 4A to 4N perform amplification, frequency conversion, and demodulation of the signals to produce reception signals. These reception signals are converted into digital signals in respective analog/digital converters 6A to 6N to produce reception signals S6A to S6N, respectively. The reception signals S6A to S6N are supplied to a signal processor 8.

In a receiving mode, a weighting coefficient calculation unit 9 of the signal processor 8 calculates reception weighting coefficients "Wra" to "Wrn" suitable for the reception signals S6A to S6N, respectively, on the basis of the reception signals S6A to S6N, a combined reception signal "Srx" output from an adder (not shown) in a subsequent stage, and a known reference signal. Then, the weighting coefficient calculation unit 9 supplies the calculated reception weighting coefficients "Wra" to "Wrn" to weighting coefficient multipliers 10A to 10N, respectively.

The weighting coefficient multipliers 10A to 10N, respectively, multiply the reception signals S6A to S6N by the reception weighting coefficients "Wra" to "Wrn". Then, the adder combines the signals to produce the reception signal "Srx". Accordingly, the signal processor 8 controls the reception directivity of all the antenna elements 2A to 2N.

In a transmission mode, the signal processor 8 separates a transmission signal "Stx" supplied from a circuit in the previous stage into N components, and supplies the separated signals to respective weighting coefficient multipliers 11A to 11N.

The weighting coefficient multipliers 11A to 11N, respectively, multiply the separated transmission signals "Stx" by transmission weighting coefficients "Wta" to "Wtn" supplied from the weighting coefficient calculation unit 9, and supply the signals to digital/analog converters 7A to 7N as transmission signals S11A to S11N. The digital/analog converters 7A to 7N, respectively, convert the transmission signals S11A to S11N into analog signals, and supply the analog-converted signals to the transmission RF units 5A to 5N.

The transmission RF units 5A to 5N, respectively, perform demodulation, frequency conversion, and amplification of the analog-converted transmission signals S11A to S11N, and transmit the resulting communication signals via the antenna elements 2A to 2N.

Accordingly, the signal processor 8 controls the transmission directivity of all the antenna elements 2A to 2N.

The weighting coefficient calculation unit 9 calculates calibration factors "Ha" to "Hn" by calibration processing described below, and multiplies the calibration factors "Ha" to "Hn", respectively, by the reception weighting coefficients "Wra" to "Wrn" to produce the transmission weighting coefficients "Wta" to "Wtn". Accordingly, fluctuations in the characteristics of the transmission systems and the reception systems are corrected, thus enabling the reception directivity and the transmission directivity to be made identical to each other.

(2) Calibration Processing Calibration processing of the adaptive array antenna 1 will be described next. The adaptive array antenna 1 can perform calibration while communicating with the mobile station without suspension of the communication operation with the mobile station.

In calibration, the adaptive array antenna 1 sets one antenna element among the antenna elements 2A to 2N and a corresponding transmission/reception system as a reference antenna system. Calibration signals are transmitted from the reference antenna system to the other antenna systems (referred to as operating antenna systems) to perform loopback.

In other words, in calibration, the signal processor 8 receives calibration signals "Scal" from a calibration signal production unit (not shown), and transmits the signals from the antenna element of the reference antenna system (for example, the antenna element 2A).

The antenna elements 2B to 2N of the operating antenna systems receive the communication signals transmitted from the mobile station and the calibration signals transmitted from the reference antenna system. The weighting coefficient calculation unit 9 separates the calibration signal components from the reception signals S6B to S6N received in the respective operating antenna systems, and calculates calibration factors on the basis of the separated calibration signal components.

The separation of the signal components and calculation for the calibration factors described above will next be described in detail with reference to FIG. 2.

Figure 2:
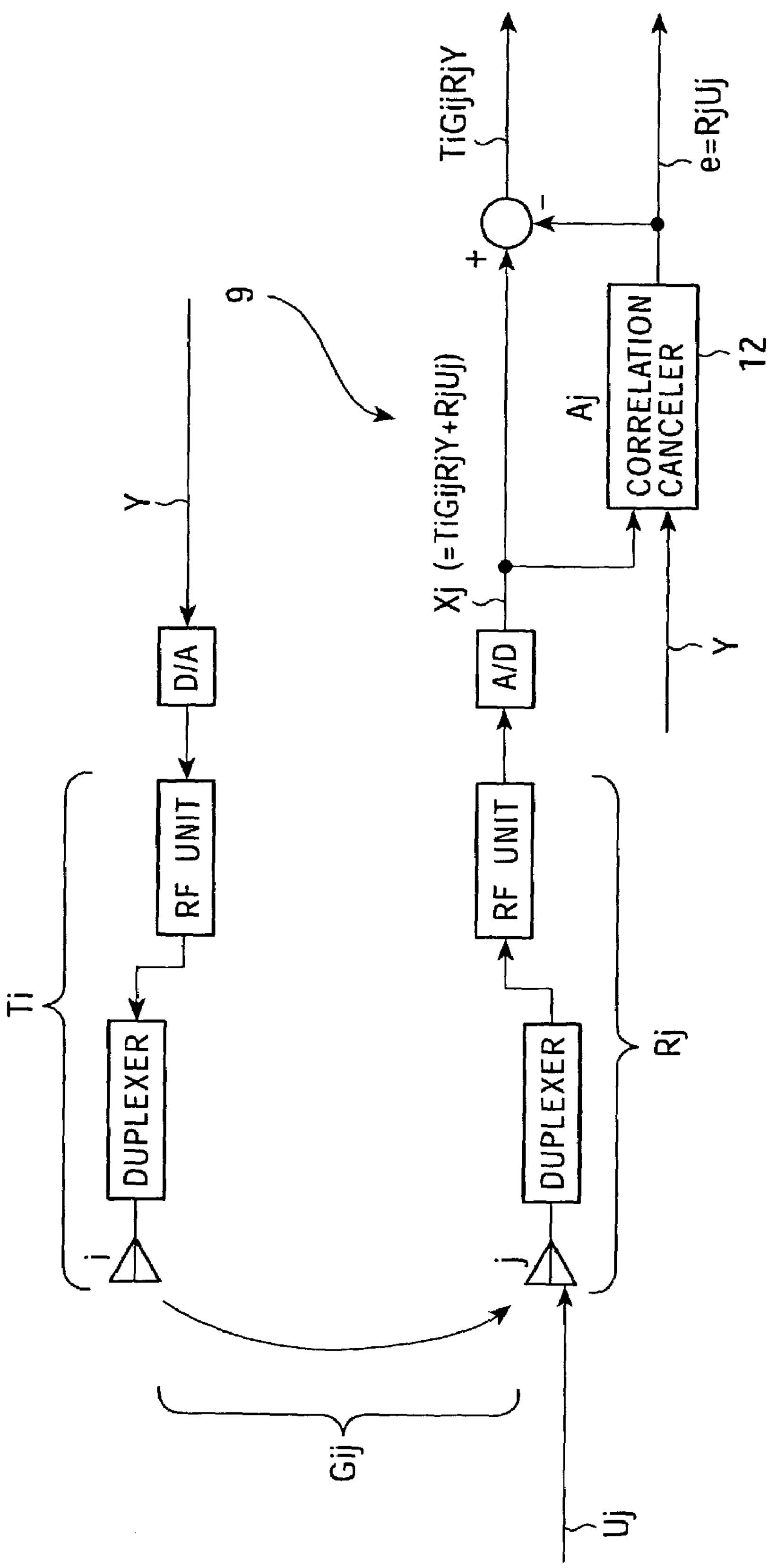
FIG. 2 is a simplified diagram for explaining transfer functions and correlation cancellation.

Referring to FIG. 2, the transfer function of the overall loopback system "Sij" can be expressed as follows:

$$Sij=TiGijRj,$$

where "Ti" represents the transfer function of an i-th transmission system (a reference antenna system), "Rj" represents the transfer function of a j-th reception system (operating antenna system), and "Gij" represents the transfer function of the space between the i-th antenna and the j-th antenna.

In performing the calibration while communicating with the mobile station, the i-th transmission system transmits a calibration signal "Y". The j-th reception system receives a reception signal "Xj=TiGijRjY+RjUj", which is a combination of the calibration signal "Y" transmitted from the i-th transmission system and a communication signal Uj transmitted from the mobile station. A correlation canceler 12 provided in the weighting coefficient calculation unit 9 separates a component uncorrelated with the calibration signal "Y" from the reception signal "Xj".

Given that the filter factor of the correlation canceler 12 with respect to the j-th reception system is "Aj", a component "e" uncorrelated with the calibration signal "Y" is expressed as follows:

$$e=Xj-AjY \quad (7)$$

Given that an ensemble average is represented by "E[]", the following equation can be obtained.

$$ReY = E[Ye^T] = 0 \quad (8)$$

$$\begin{aligned} ReY &= E[Ye^T] = E[(X-HY)Y^T] \\ &= E[XY^T] - AE[YY^T] - RXY - AjRYY \end{aligned}$$

From equation (8), the filter factor "Aj" can be represented by the following equation:

$$Aj=RXYRYY^{1}ReY=E[XY^T]\ E[YY^T]^{-1} \quad (9)$$

Here, a reception signal "X" is separated into a component "X1", which is correlated with "Y", and a component "X2", which is uncorrelated with "Y". (X=X1+X2)

$$\begin{aligned} RXY &= E[XY^T] = E[(X1+X2)Y^T] \quad (10) \\ &= RX1Y + RX2Y = RX1Y \end{aligned}$$

$$\text{Estimated value } [X]=RXY+RYY^{-1}Y= \text{estimated value } [X1] \quad (11)$$

$$\begin{aligned} e &= X - \text{estimated value } [X] \quad (12) \\ &= X1 + X2 - \text{estimated value } [X] \\ &= (X1 - \text{estimated value } [X]) + X2 \end{aligned}$$

Accordingly, the correlation canceler 12 can output the component "X2" which is uncorrelated with the calibration signal "Y" (i.e., a communication signal from the mobile station "e=RjUj"). Here, the "estimated value [X]" is "TiGijRjY", which is a component correlated with "Y". Furthermore, the weighting coefficient calculation unit 9 separates the calibration signal component "TiGijRjY" by subtracting the component "e" from the reception signal "Xj". Accordingly, the weighting coefficient calculation unit 9 separates the reception signals into the calibration signal components and the communication signal components.

The weighting coefficient calculation unit 9 performs signal component separation processing for the reception signals of all the operating antenna systems. The weighting coefficient calculation unit 9 calculates the calibration factors "Ha" to "Hn" on the basis of the calibration signals of the respective operating antenna systems. The weighting coefficient calculation unit 9 multiplies the calibration factors "Ha" to "Hn", respectively, by the reception weighting coefficients "Wra" to "Wrn" to produce transmission weighting coefficients "Wta" to "Wtn". Accordingly, fluctuations in characteristics of the transmission systems and the reception systems are corrected, so that the reception directivity and the transmission directivity are made identical to each other.

The adaptive array antenna 1 communicates with the mobile station even while performing calibration by applying weights to the communication signal components separated from the respective reception signals and combining them together in the weighting coefficient calculation unit 9.

(3) Operation and Effect

With the arrangement described above, the adaptive array antenna 1 sets one antenna element and the corresponding transmission/reception system as a reference antenna system during calibration. The reference antenna system transmits calibration signals to the other operating antenna systems. The operating antenna systems receive the communication signals transmitted from the mobile station and the calibration signals.

The correlation canceler 12 of the weighting coefficient calculation unit 9 separates the reception signals received in the respective operating antenna systems into calibration signal components and communication signal components. The weighting coefficient calculation unit 9 calculates calibration factors on the basis of the separated calibration signal components, and produces respective transmission weighting coefficients by correcting respective reception weighting coefficients by using the calibration factors. Accordingly, fluctuations in characteristics of the transmission systems and the reception systems are corrected, thus enabling the reception directivity and the transmission directivity of the adaptive array antenna 1 to be made identical to each other.

The adaptive array antenna 1 can communicate with the mobile station even while performing calibration by applying weights to the communication signal components separated from the respective reception signals and combining them together in the weighting coefficient calculation unit 9.

With the arrangement described above, during calibration, calibration signals are transmitted from any antenna system to the other antenna systems, components correlated with calibration signals are separated from the reception signals received in the other antenna systems, calibration factors are calculated on the basis of the separated calibration signal components, and components uncorrelated with the calibration signals are weighted and combined together. Accordingly, calibration can be performed while communicating with the mobile station.

(4) Modifications

In the embodiment described above, during calibration, one antenna element among the antenna elements 2A to 2N is set as a reference antenna, and calibration signals are transmitted from the reference antenna. However, the present invention is not limited to this. A calibration signal transmission antenna, which is used only for transmitting calibration signals, can be provided separately from the antenna elements 2A to 2N.

Also, in the embodiment described above, the case in which communication signals are received from the mobile station during calibration has been described. However, the present invention is not limited to this. The present invention may also be applied to the case in which the communication signals are transmitted to the mobile station during calibration.

In such a case, the reference antenna system transmits signals combined from the calibration signals and the communication signals, and the operating antenna systems transmit only the communication signals. Components correlated with the calibration signals alone are separated from the reception signals (combination of the calibration signals and the communication signals) received in the operating antenna systems. This enables calculation of calibration factors, as in the embodiment describe above.

What is claimed is:

1. An adaptive array antenna comprising:

an array antenna including a plurality of antenna elements;

a plurality of reception means for receiving reception signals from the respective antenna elements, multiplying the reception signals by respective reception weighting coefficients, and outputting the weighted reception signals;

a plurality of transmission means for multiplying transmission signals by respective transmission weighting coefficients and then transmitting the weighted transmission signals from the respective antenna elements;

reference signal transmission means for transmitting a predetermined reference signal from an antenna element of the plurality of antenna elements;

signal component separation means for separating each of the reception signals into a correlated signal component correlated with the reference signal and an uncorrelated signal component uncorrelated with the reference signal, said uncorrelated signal component originating from a correlation canceler; and weighting coefficient correction means for updating each of the transmission weighting coefficients on the basis of the corresponding correlated signal component.

2. An adaptive array antenna according to claim 1, wherein the reception means multiplies the uncorrelated signal component by the corresponding reception weighting coefficient.

3. A method of calibrating an adaptive array antenna having a plurality of antenna elements, comprising the steps of:

multiplying transmission signals by respective transmission weighting coefficients and then transmitting the weighted transmission signals from the respective antenna elements;

transmitting a reference signal from an antenna element of the plurality of antenna elements;

separating a reception signal received from the plurality of antenna elements into a correlated signal component that is correlated with the reference signal and an uncorrelated signal component uncorrelated with the reference signal, said uncorrelated signal component originating from a correlation canceler; and updating each of the transmission weighting coefficients on the basis of the corresponding correlated signal component.

4. An adaptive array antenna having a self-calibration mechanism operable during use of the antenna, comprising:

an array antenna including a plurality of antenna elements;

a reception mechanism configured to receive reception signals from the respective antenna elements, said reception mechanism configured to multiply the reception signals by respective reception waiting coefficients and output weighted reception signals;

a transmission mechanism configured to multiply transmission signals by respective transmission weighting coefficients and transmit the weighted transmission signals from the respective antenna elements;

a reference signal transmitter configured to transmit a predetermined reference signal from an antenna element of the plurality of antenna elements;

a signal component separation mechanism configured to separate each of the reception signals into a correlated signal component correlated with the reference signal, and an uncorrelated signal component uncorrelated with the reference signal, said uncorrelated signal component originating from a correlation canceler; and a weighting coefficient correction mechanism configured to update each of the transmission weighting coefficients based on corresponding correlated signal components.

* * * * *